US006963905B1

(12) United States Patent
Melman

(10) Patent No.: US 6,963,905 B1
(45) Date of Patent: Nov. 8, 2005

(54) SYSTEM AND METHOD INCLUDING A COMMUNICATION INTERFACE FOR TRANSFERRING INFORMATION BETWEEN AT LEAST TWO PROCESSES

(75) Inventor: Yael Melman, Newton, MA (US)

(73) Assignee: EMC Corporation, Hopkinton, MA (US)

( * ) Notice: Subject to any disclaimer, the term of this patent is extended or adjusted under 35 U.S.C. 154(b) by 642 days.

(21) Appl. No.: 09/833,906

(22) Filed: Nov. 15, 2000

Related U.S. Application Data

(63) Continuation of application No. 08/939,772, filed on Sep. 29, 1997, now abandoned.

(51) Int. Cl.[7] ........................ G06F 15/167; G06F 15/16
(52) U.S. Cl. ...................................... 709/213; 709/227
(58) Field of Search ................................ 709/213, 214, 709/227, 228; 370/381; 712/28, 31; 711/112, 711/202

(56) References Cited

U.S. PATENT DOCUMENTS

| 5,475,601 | A | * | 12/1995 | Hwang | 700/157 |
| 5,568,487 | A | * | 10/1996 | Sitbon et al. | 370/466 |
| 5,619,650 | A | * | 4/1997 | Bach et al. | 709/246 |
| 5,721,876 | A | * | 2/1998 | Yu et al. | 703/27 |
| 5,987,517 | A | * | 11/1999 | Firth et al. | 709/230 |
| 6,012,084 | A | * | 1/2000 | Fielding et al. | 709/205 |
| 6,061,796 | A | * | 5/2000 | Chen et al. | 713/201 |
| 6,088,725 | A | * | 7/2000 | Kondo et al. | 709/220 |
| 6,108,704 | A | * | 8/2000 | Hutton et al. | 709/227 |
| 6,366,958 | B1 | * | 4/2002 | Ainsworth et al. | 709/230 |
| 6,449,652 | B1 | * | 9/2002 | Blumenau et al. | 709/229 |
| 6,502,147 | B2 | * | 12/2002 | Reilly | 710/104 |
| 6,550,012 | B1 | * | 4/2003 | Villa et al. | 713/201 |
| 6,802,068 | B1 | * | 10/2004 | Guruprasad | 719/319 |
| 2003/0110296 | A1 | * | 6/2003 | Kirsch et al. | 709/246 |

OTHER PUBLICATIONS

Hughes, Larry, "Edmund: a multicast kernel for distributed application", ACM Symposium on Small Systems, pp. 296-304, Jul. 1990.*
Cornelius, Barry, "Using CORBA and JDBC to produce three tier systems", ACM SIGPLAN Notices, vol. 33, iss. 4, pp. 44-52, Apr. 1998.*
Fung, K.P. et al., "A transport-level proxy for secure multimedia streams", IEEE Interent Computing, vol. 4, iss. 6, pp. 57-67, Dec. 2000.*
Holcman, A. R.,"Integrating an IN CS-2 call model to an ATM switch", IEEE Proceedings of ICC'97, vol. 1, p 448-52, Jun. 1997.*
Okoshi, T. et al.,"MobileSocket: toward continuous operation for JAVA applications", IEEE Proceedings of ICCN'99, p 50-57, Oct. 1999.*

* cited by examiner

Primary Examiner—Jason D Cardone
(74) Attorney, Agent, or Firm—Robert Kevin Perkins; Leanne J. Fitzgerald; John M. Gunther

(57) ABSTRACT

A communication mechanism and method for assisting in the transfer of information between at least two processes through a data storage system is provided. The communication mechanism is provided between a protocol family and the process, and is capable of communicating with both. Both the processes and the protocols may differ depending on the functions desired. In the preferred embodiment of the invention, the communication mechanism is a socket interface which it utilized through the use of a series of calls contained in a socket library. The calls contained in the socket library are used to create a socket, and such socket is then used to effectuate a transfer between at least two processes through a data storage system to another process.

17 Claims, 3 Drawing Sheets

SYSTEM AND METHOD INCLUDING A COMMUNICATION INTERFACE FOR TRANSFERRING INFORMATION BETWEEN AT LEAST TWO PROCESSES

This is a continuation of application Ser. No. 08/939,772 filed Sep. 29, 1997, now abandoned.

BACKGROUND OF THE INVENTION

The invention relates generally to a communications mechanism for assisting in the easy transfer of information between processes typically running on different host processors. Particularly, the invention relates to a communication endpoint structure which allows different application processes, or simply processes to be utilized in transferring information between processes via a data storage system.

For example, file transfers between different computers are usually done using a communication protocol over a network. Examples of well known communication protocols include the System Network Architecture Protocol (SNA) and Transmission Control Protocol/Internet Protocol (TCP/IP). In addition to the communications protocol an application program or process, such as FTP (File Transfer Protocol) is layered on top of a protocol to effectuate a file transfer over a communication protocol such as TCP/IP.

Most application processes are written to use an application programming interface (API) for effectuating transport services. The API serves as means for allowing two processes to communicate with one another, and hide the implementation of transport details to the processes. A socket is an communication endpoint or a transportation structure most commonly used with a UNIX® operating system, although it is not limited to a UNIX operating system. The socket is an object which identifies the communication endpoints between the two processes. The socket API typically hides the protocol of the network architecture or the computer software architecture present in the host processors that the application processes are placed on. Thus, a socket allows the easy association of an endpoint such as an application process, any protocol, or protocol implementation.

As stated, file transfers between different computers are often done over a network. A file transfer is an example of a process that uses the network to moves files between different processes. The processes may reside on different host processes or even on the same host processor. These files may be moved through a network. File transfers may also be done without the presence of a network. EMC Corporation, assignee of the present application and pending application Ser. No. 08/723,137 which is incorporated herein by reference, discloses a file transfer processes which is used by processes on two different computers to communicate, not through a network, but through a data storage system. However, the use of such a file transfer process does not currently provide an easy means of enabling communication between the file transfer processes, or any other process such as one typically used by a user.

It is therefore desired to provide a communication mechanism capable of easily communicating between different processes through a data storage system. It is also desired to have a communication mechanism which can be used by processes which offer different services or functions. The present invention through the use of the communications mechanism and method described hereafter allows for a data storage system to be used as a median for the transfer of data, while allowing for different processes to be used with a single communications mechanism.

SUMMARY OF THE INVENTION

A communication mechanism for at least first and second processes contained on a plurality of host processors connected by a data storage system is provided. The communication mechanism includes at least one interface which is capable of enabling communication via the data storage system, where the interface is contained on each of the plurality of host processes, and in the preferred embodiment of the invention the communication mechanism is resident in each of the processes to facilitate the communications between the processes.

Also included in the invention is a plurality of computer system calls. The computer system calls are available to the user of one process to communicate with another processes, where the processes are connected through a data storage system. The calls are used to first, obtain a communications mechanism which effectuates the communications between the different processes. Once the communications mechanism is obtained, a local address is created for the communications mechanism. Subsequently, a connection is established between the different processes which, upon the occurrence of some additional steps allows for the transfer of data and messages between the different processes.

The invention also includes a method for using a communication mechanism to transfer information between at least first and second processes through a data storage system. The method includes the steps of creating a communication mechanism, and then using the created communication mechanism to create a connection between the first and second processes. Once the communication is established, information can be transferred between the first and second processes through the data storage system.

In accordance with another aspect of the invention a system includes a plurality of host processors, on which a plurality of processes reside. The host processors include local storage, and the host processes are connected to a data storage system. Also resident on each of the plurality of host processors is a communication mechanism which permits information stored in the local storage area to be transferred through the communication mechanism, to the data storage system using the communication mechanism and then to a processes on another one of the plurality of host processors.

The invention also includes a data storage system for transferring information from a first process to a second process. Each one of the processes is running on a different host processor. Each host processor is connected to the data storage system. The data storage system comprises a plurality of storage devices and also has a shared storage region into which both the first process and the second process share access. Implemented on at least one of the plurality of storage devices is a control block table which serves to allocate a communication mechanism for a first process when the first process wishes to establish a connection to the second process so that information can be transferred from one process to another via the data storage system.

BRIEF DESCRIPTION OF THE DRAWINGS

The above and further advantages of the present invention may be better understood by referring to the following description taken in conjunction with the accompanying drawings in which.

DETAILED DESCRIPTION OF THE PREFERRED EMBODIMENT

As is known, a traditional socket is similar to a UNIX file mechanism in that it provides an endpoint for communication. The need for sockets arose partially because those processes needed to be able to initiate and facilitate communications to different destination points or end points. Such end points would typically be another process.

Because such processes usually need to utilize different protocols, the process must be capable of explicitly specifying that an address is an IP address. Traditional processes request the operating system (UNIX, for example) to create or allocate a socket as needed. Once a socket is created the operating system returns an integer that the process then uses to reference the just created socket. It should be noted that when a socket is created it is not bound to a destination address, as it is not even bound to a local address. A socket must be bound to a local address prior to being able to connect, much less communicate with a process at a different destination address. However, it is up to the process whether to supply an address when the socket is used or as in common in with a TCP/IP connection, the process can bind the destination address to the socket, and thus is not required to keep having to specify the destination address.

As noted earlier, the process in pending patent application Ser. No. 08/723,137 does not contain the communications mechanism of the present invention. The earlier process does, of course, contain a communication mechanism in order to transfer the files, it does not do so an easy or efficient manner as will be explained in conjunction with FIG. 1.

Figure 1:
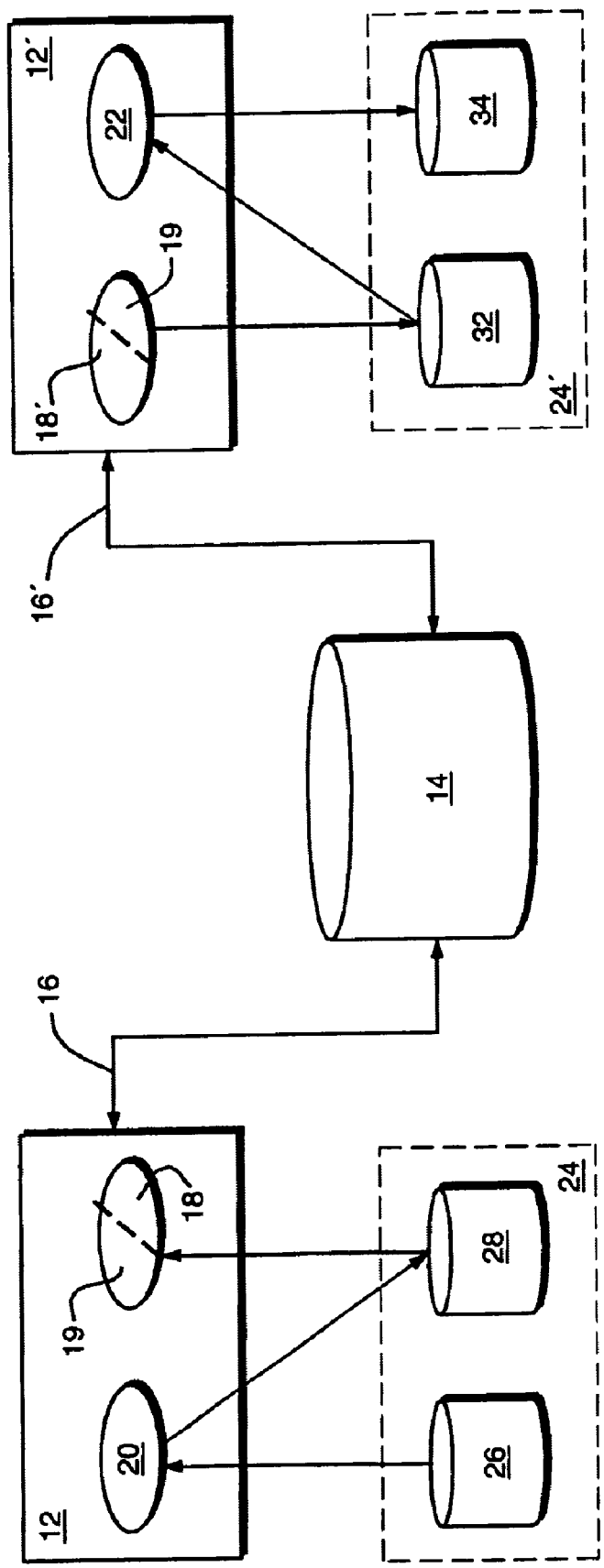
FIG. 1 is schematic block diagram of a prior art mechanism to transfer information without the communication mechanism of the present invention.

Referring to FIG. 1, a block diagram which shows a file transfer process, without use of the present invention, is shown as 19 and 19'. The overall system which embodies the prior art includes a plurality of host processors 12 and 12' that are connected to a central data storage system 14. Host processors 12 and 12' are typically digital processing units which include one or more CPUs and main memory. They might be, for example PCs, workstations, symmetric multiprocessors, or a massively parallel processor which contains many CPUs, In general, data storage system 14 contains a shared memory (not shown) that is accessible to all of the host processors that are connected to the data storage system 14. The control structures and transfer buffers that are stored in the shared memory provide a mechanism by which one host processor can transfer files to and receive files from another host processor that is connected to the data storage system 14.

Still referring to FIG. 1, host processors 12 and 12' are connected to data storage system 14 through respective host connections 16 and 16'. Data storage system 14 contains the physical memory in which data is stored. The particular manner in which the physical memory within the data storage system 14 is implemented and how it is partitioned is not of central importance. Examples of commercially available products that can be used to implement data storage system 14 are the Symmetrix 3XXX and 5XXX series family of Integrated Cached Disk Array® products from EMC Corporation of Hopkinton, Mass., assignee of the present invention. The ICDA devices are high-performance integrated cache disk arrays designed for on-line data storage. It should be understood that other designs known to persons skilled in the art may also be used to implement data storage system 14.

The system of FIG. 1 also includes local storage 24 attached to the host processor 12. Local storage 24 may be included with the host processor 12 or may be part of a separate data storage system.

If host processor 12 has a UNIX operating system, local database 26 contained in local storage 24 could be any one of numerous databases which work with the UNIX operating system. An example of such a database would be those produced by Oracle Corporation. When using a proprietary database such as Oracle, any files extracted by the host computer 12 through an process 20, such as an extractor, would have to be placed in a sequential file format prior to transfer to the second host processor 12. Typically, proprietary databases provide a process in which the databases are capable of creating sequential files through the extract process. This translation into a sequential file must occur prior to the transfer of any files to the second host processor 12. This, as is well known in the art, must occur because the format used by an Oracle database to store any files is unique to the Oracle database which originally created the file.

It should be noted that communication mechanism 18, which is built into the process 19, is not truly capable of directly interfacing with the process 19 shown in FIG. 1. In order for the communication mechanism 18 to receive or obtain the desired file information from the process 19, the file transfer process 19 must generate a separate file which can then be accessed by the communication mechanism 18. Thus, there is not any actual interaction between the file transfer process 19 and the communication mechanism 18, and additional steps are required, within the process 19 to effectuate getting the file to the communication mechanism 18.

The communication mechanism 18 for the process 19 has to be built into the process 19, as the process 19 is designed. Therefore, if it is desired to use another or different process, communication mechanism 18 is not of any use. Any other process will have to include its own unique communication mechanism 18 in order to communicate with any other process. This means that all processes require additional functions in order to accomplish a similar function.

Second host processor 12', also has its own communications mechanism 18' within file transfer process 19'. Another process is shown as a loader 22. When communications mechanism 18' receives the sequential file from the host processor 12, the communications mechanism 18' writes the sequential file into a file when can then be accessed by the file transfer process 19'. The file transfer process 19' can then write the received file into the local storage 30. Local storage 30 also contains sequential file storage 32 and storage for a proprietary database which is running on the host processor 12'. If, for example, host processor 12' is a mainframe computer that has an MVS operating system such as those manufactured by IBM Corporation, an example of a proprietary database which runs on an MVS operating system is DB2. DB2 is also produced by IBM.

After the sequential file is written into the sequential file storage 32 the loader 22 reads the sequential file from the sequential file storage 22 and loads it into the storage for it's proprietary database 34. It should be understood by those skilled in the art, that a conversion program (not shown) needs to be present in both host processors to convert a received sequential file into the format of the database running on the host processor. In this example, host processor 12 needs to convert the sequential file received from host processor 12 into a format suitable for a DB2 database.

Figure 2:
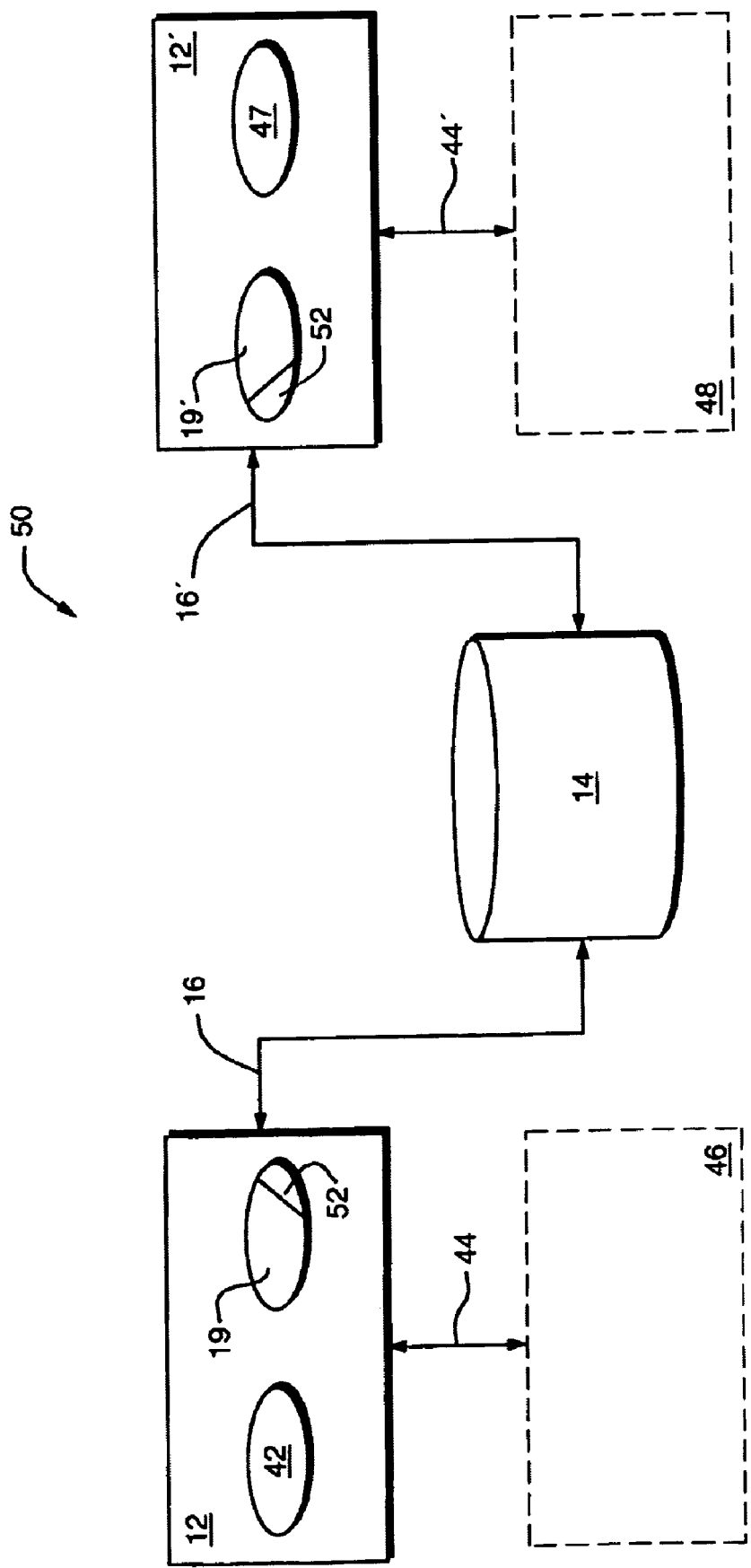
FIG. 2 is a schematic block diagram of a system including the communication mechanism of the present invention.

Referring to FIG. 2, a system 50 which includes the present invention is shown. The system 50 includes a plurality of host processors 12 and 12' that are connected to a data storage system 14. As in the prior art, host processors 12 and 12' are digital processing units which include one or more CPUs in main memory.

Data storage system 14 also contains a shared memory, such as a cache memory, that is accessible to all of the host processors that are connected to the data storage system 14. The control structures and transfer buffers that are stored in the shared memory provide a mechanism by which one host processor can transfer files to and receive files from another host processor that is connected to the data storage system. The host processors 12 and 12' are each connected to the data storage system 14 through respective host connections 16. To simplify the discussion, only a single host connection is shown for each processor. It should be understood, however, that there could in fact be multiple communications between the data storage system and a processor.

Data storage system 14 contains a physical memory, such as disk drives, in which data is stored. The manner in which the memory within the storage system is implemented and how stored data is partitioned is not of importance to the present invention. Examples of commercially available products that can be used to implement data storage system 14 are the Symmetrix 3XXX and Symmetrix 5XXX series of data storage products from EMC Corporation.

Each of the host processors 12 and 12' is connected via host connections 44 to local storage 46 and local storage 48 respectively. It should be understood local storage 46 and local storage 48 may be part of the respective host processors 12 and 12', or separate data storage units. Other processes such as an extractor and a loader are shown as 42 and 47 respectively. Local storage 46 and local storage 48, in the invention represent proprietary storage, such as that which would be provided by proprietary databases such as DB2 by IBM for host processors having an MVS operating system, and an Oracle database which is provided for processors having a UNIX operating system. Prior to and after the transfer of information between processes 19 and 19', the use of the processes 42 and 47 is similar to that explained earlier.

Each of the host processors 12 and 12' also includes a communication mechanism 52, within the processes 19 and 19' which will be described in greater detail. In the preferred embodiment of the invention, communications mechanism 52 comprises a socket applications programming interface, which is responsive to a set of procedures whereby varying processes, such as those shown at 19 and 19', on the different host processors 12 and 12' can use to communicate with one another through the data storage system 14. The use of the communication mechanism 52 allows processes 19 and 19' to directly interface with the communication mechanism 52 without having to generate a file to be separately accessed by the communications mechanism 52. Therefore, the communication mechanism 52 acts as a transparent means to allow processes 19 and 19' to communicate with one another, and also allows for processes with different functions to be used with the same communication mechanism 52.

In the prior art as demonstrated in FIG. 1, communication mechanism 52 did not include the socket applications programming interface, but instead was a communication vehicle individually placed into each processes Therefore, any process, such as the earlier file transfer process was not capable of easily communicating with another process.

Figure 3:
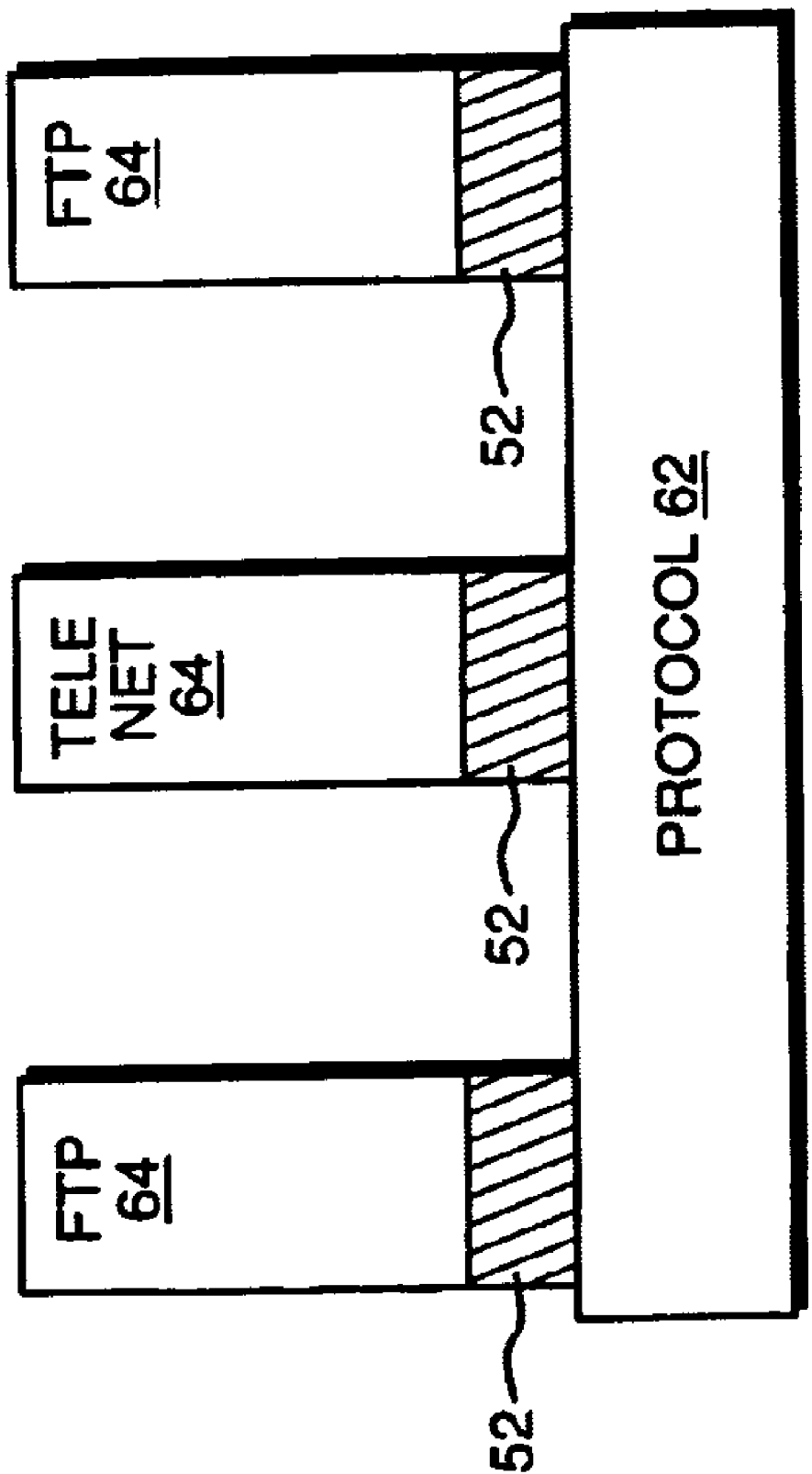
FIG. 3 is a block diagram showing the logical placement of the communication mechanism of the present invention.

FIG. 3 is a logical block diagram showing how the communication mechanism 52 interacts with both processes and a particular protocol. Communication mechanism 52 is capable at of interacting with any one of a number of processes shown as 64. For example, process 64 could include the aforementioned FTP; PTP (Process to Process) and Telnet, as the communication mechanism 52 allows the transport vehicle, the protocol 62, to be transparent to the process, regardless of the type or function of the processes 64. Beneath the communication mechanism 52 is the protocol 62. In the preferred embodiment of the invention the protocol 62 is a protocol used to pass messages or files between at least two host processors through a data storage system. The protocol represents the actual rules used to pass messages through the data storage system. It should be understood that the protocol allows the transfer of messages or files between a host processor that has a UNIX operating system (or another operating system such as NT) and a second host processor using a MVS or mainframe operating system, or any combination thereof. The details of the protocol are not particularly relevant here, as it is merely the transport vehicle. The important fact is that the communication mechanism 52 is interposed between the processes 64 and a protocol 62, and is capable of effectuating communications between two host processors through a data storage system.

In the preferred embodiment of the invention, communication mechanism 52 is a socket interface that enables the processes 19 and 19', again referring to FIG. 2, to communicate in a transparent manner with the protocol being used to transport information to and from the data storage system 14.

A library is provided to the user of the processes to provide a set of procedures that the processes running on each of the host processors will use to establish communications with each other. As will subsequently be explained, the library includes a plurality of different calls which are used to effectuate different functions required for the communication to occur with the data storage system 14. In the preferred embodiment of the intention the library is a set of function or socket calls.

Generally, a socket is allocated or created with a socket call to a socket interface, residing within the processes 19 and 19' of FIG. 2. To create a socket, a socket call is used. The following is the structure of the socket call:

Socket (domain, type, protocol)

The socket call is used to create or allocate the socket from the data storage system. The newly created socket will then be able to begin and use the connection and communication process between two processes, such as those shown in 19 and 19' in FIG. 2. In the preferred embodiment of the invention the call is:

STPsocket(PF_STP, SOCK_STREAM, PF_STP)

PF_STP represents the protocol family. AF_STP may also be used in place of AF_STP if it is desired to use an address family instead of a protocol family. In this case the Symmetrix Transport Protocol (STP) is used by the socket to facilitate communication over the data storage device. SOCK_STREAM represents the type of communication used, which is a reliable stream delivery service, and PF_STP is the identification of the specific protocol family, STP, used by the socket.

The use of the above socket call actually has the process resident on the host processor obtaining a free socket control block from the control block called STP socket table (not shown) resident on the data storage system. Thus, the STP socket table allocates a free socket when the user of the process wishes to create a socket. In the preferred embodiment of the invention the STP socket table resides on disk drives on the data storage system 14. It should be understood the STP socket table could reside elsewhere, such as in a shared memory. Placing the STP socket table on the disk drives allows for the STP socket table to be recoverable, as is well known in the art, with a RAID (redundant arrays of intelligent disks) storage system, case of problems with the data storage system.

When the socket has been allocated by the STP socket table, the STP socket call returns a non-negative integer to the user of the process to identify the allocated socket. A copy of the allocation is then made into the process memory. A newly created socket, however, does not have any connection or association to a local or destination address. A local address usually needs to be established for the for the process using the socket so the process can specify to the host processor a port for itself to effectuate communications. In order to establish a local address for itself the bind call is used:

STPbind(socket, localaddr, addrien)

Socket, within the STPbind call, is the integer descriptor of the socket to be bound, and is available to the user of the process once the socket is created. Localaddr is the structure that specifies the local address to which the socket will be bound, and addrien represents the length of the address. In the preferred embodiment of the invention, the user would insert the integer descriptor of the socket, a local address which includes the system name, the Symmetrix Transport Group (STG) name (i.e. STG), a port number, and the length of the local address. If a port number is not supplied, as would be the case when the process is a client versus a server, a free port from the specific STP port file will automatically be assigned to the socket. If the STPbind call is successful, the system returns a zero value to the process.

Until now all that has been described is how to create a socket, and how to bind a local address to the created socket. In order to accomplish the desired goals of the process, there are additional functions which have to be utilized before actually transferring any data or sending any messages to another process through the data storage system.

Typically the process that initiates the connection is termed a client process, while the process which accepts or listens to the client process is termed the server process. These terms are usually only used prior to the connection being established, as is subsequently described.

It is desired that the process use a connect call to establish a connection with another process. In this invention the other process is typically a remote connection partner resident on another host processor. See FIG. 2. A socket connect call is used to establish a connection between two processes. The connect system call is as follows:

STPconnect(socket, name, addrien)

Socket is the integer descriptor of the socket to be connected to the process. Name is the socket address structure that specifies the name and destination address of the other process (i.e. server remote connection partner). Addrien specifies the length of the destination address, and is usually measured in bytes. It should be understood that when establishing a connection, the process attempting to establish the connection must wait until the other server or remote process "accepts" the request. The server process being connected may include a queue if it is not ready to accept a request.

Once the connection is established throughout the use of socket between two processes, both processes can send and receive data. The next set of calls are used for the message exchange between the processes to send and receive data through the sockets. In order to send data from one process through the data storage system to another process the following call is used:

STPsend(socket, message, length, flags)

The STPsend call is used to send data, as the sockets within each process have been connected. For the STPsend call, socket identifies the already called socket to be used to send the data. Message is used to give the address/buffer location of the data to be sent. Length indicates the number of bytes of data to be sent, and flags, if used, can indicate a variety of different items. For example, one value for flags can allow the process to request the message be sent with routing tables local to the process. Flags are typically used to permit the initiating process to have some control of the routing of the message being sent. However, for a message or data to be sent through the data storage system, flags need not necessarily be used.

Obviously, once the initiating process sends the data it must be received by the other or remote process. Referring again to FIG. 2, data is sent, for example, from process 19 containing a communication mechanism 52 over connection 16, through data storage system 14, over connection 16' to be received by process 19', which contains communication mechanism 52. Data storage system 14 uses a shared memory region, such as a cache memory (not shown) shared by both processes 19 and 19' to both establish the connection and to send and receive information or data. An example of how a shared memory region is used in this manner is shown in Applicant's prior pending patent application Ser. No. 08/723,137. Process 19' needs to be capable of receiving data sent by the process 19 through the communication mechanism 52. Process 19' will receive the data through the communication mechanism 52, which as already indicated, as been connected to process 19. The STPrecv call is used by the process 19' to receive messages or data from the process 19. The STPrecv call is used as follows:

STPrecv(socket, message, length, flags)

Socket specifies the socket from where the data is being received. Message is used to specify the address or buffer location into which the received data will be placed upon receipt. Length specifies the length of the buffer location, and flags, in this call, are used to permit the process that initiated the receive request to control the reception of the sent data by the sending process. If a MSG_PEEK argument is used for flags, the data will be returned to the initiating process, but not deleted from storage. Therefore, if a subsequent STPrecv call is used, the same data will be returned again. Remember, once the connection is established files, data or messages may be sent in either direction not just from 19 to 19'.

After the desired data is sent through one socket and received by the other process, the connection established must be terminated. The STPclose call is used to terminate a connection. The initiating process waits for the communication to be completed, and then releases the all of the resources used for the communication. The STPclose call is as follows:

STPclose(socket)

The user simply has to identify the socket to be closed. A connection may also be terminated while a communication is still ongoing. The STPshutdown call is capable of stopping the transfer of data in one or more directions. The STP shutdown call is as follows:

STPshutdown(socket, how)

The socket to be shutdown needs to be identified. How can have a value of zero (0), one (1), or two (2). If the value of how is zero, incoming data to the socket will be stopped. If the value of how is one, data outgoing from the socket will be stopped. If the value of how is two, all communication will cease. If the value of how is two, the call works the same way as does the STPclose call.

The above described calls demonstrate how to use processes to create a socket, establish a connection with another process, through a data storage system, send/receive data between two processes through the data storage system and terminate the connection and/or communication with the use of the shared memory region on the data storage system.

Other calls are available to the user in order to permit the user to exercise additional control over the sockets. A list of the calls available to the user to control the sockets within processes residing on host computers connected with a data storage system is provided below.

It is understood that there are processes that are capable of using only one type of socket. It is contemplated by the present invention that a translating header program, which is another process, such as those shown at 42 and 47 in FIG. 2, is made available to the processes so if the process is capable of only using a different type of socket (i.e. TCP/IP), the process can use the translating header program to translate the socket calls the process has into the desired format. In this case the desired format is the use of STP sockets and STP socket calls. Then the process has the communication mechanism necessary to communicate with a protocol capable of communicating with a data storage system without having to change the processes.

A summary of the typical library calls, as indicated above, along with their functions, are listed below.

| STPaccept | Used by the server partner to complete a connection request initiated by the client. The server chooses the client which is on top of the queue of connection requests. |
|---|---|
| STPbind | Used to insert the local address into the Socket Control Block. This information will be used by the STPlisten call to inform clients that a server is ready for communication. |
| STPclose | Used to close a connection. |
| STPconnect | Used by the client partner to request a connection with a server. |
| STPgethostbyname | Used to return to the caller the STP address using a host name. |
| STPgethostname | Used to return to the caller the STP address of the current socket. Used if the caller does not call STPbind but expects to have a default address assigned to it. |
| STPgetpeername | Used to return to the caller the name of the connection partner. |

-continued

| STPgetsockopt | Used to obtain information about socket options configuration. |
|---|---|
| STPlisten | Used to configure the maximum queue of pending connection requests. |
| STPrecv | Used to read data by the connection partner. |
| STPsend | Used by a communicating partner to send data to its peer. |
| STPsetsockopt | Used to modify (set) socket optional configuration. |
| STPsocket | Each communicating partner must first call STPsocket to obtain a Socket Control Block where control information of the connection is stored. |

The following are also library calls available to the user of process. The only difference from the calls above, is that these calls cannot be used with those of a different type of socket library (i.e. TCP/IP). These calls are useful in certain operating environments, particularly an MVS one.

| STPerror | Reports to the caller additional error information which is specific to the socket over STP implementation |
|---|---|
| STPgetopt | Returns the current value of an STP specific parameters. |
| STPsetopt | Sets STP parameters. |
| STPstrerror | Returns to the user a pointer to a string which provides text associated with the last STP specific error. |
| STPgivesocket | Used by one process to make a specific socket available to a STPtakesocket call issued by another process. |
| STPtakesocket | Used by a process to acquire a socket from another process. |

The principles of the underlying communication mechanism can be used for any kind of transfer, not just the transfers as described herein. Although the communication mechanism of the present invention has been described for use with a Symmetrix data storage system, it is contemplated that the communications mechanism of the present invention is capable of being used whenever processes wish to communicate with each other through a data storage system.

Having described the preferred embodiment of the present invention, it will now become apparent to those who are skilled in the art that other embodiments incorporating it's concepts may be provided. It is felt, therefore, that this invention should not be limited to disclosed embodiment, but rather should be limited only by the spirit and scope of appended claims.

What is claimed is:

1. In a network having a plurality of computer system calls, said computer system calls available to a user of a first process residing on a first processor to begin and facilitate communication with a second process residing on a second host processor, through a data storage system, wherein the first and second processors are separately coupled to the data storage system, said computer system calls comprising:

a first call within said process to obtain a communication mechanism that is an interface from said data storage system, wherein said first call selects a transfer means and a desired type of communication, wherein the interface is a socket that is allocated from a shared memory region in said data storage system by one of the processes, wherein the socket is not bound to any specific destination address;

a second call within said first process to create a local address for said first process to use with said communication mechanism; and a third call within said first process to create a connection between said first process and said second process, wherein said third call connects said first process to said second process.

2. The plurality of computer system calls of claim 1, wherein said plurality of computer system calls includes calls to use said communication mechanism to transfer information between said first and said second process through said data storage system.

3. The plurality of computer system call of claim 2, further comprising:

a fourth call in which either of said first process is an initiating process and sends information to said second process through said data storage system.

4. The plurality of computer system calls of claim 3, further comprising:

a fifth call in which said second receives information from said first processes.

5. The plurality of computer system calls of claim 4, further comprising:

a sixth call to terminate said connection between said first and said second processes.

6. The plurality of computer system calls of claim 5, wherein said first and said second processes each reside on a different host processor, and each said host processor is connected to said data storage system.

7. A system comprising:

a plurality of host processors, wherein each host processor includes a plurality of processes resident on of each of said host processors;

a local storage area connected to each of said plurality of host processors;

a data storage system separate from said plurality of host processors and connected to each of said plurality of host processors; and a communication mechanism that is at least one interface that is resident within each one of said plurality of processes, in which information stored in said local storage area is transferred by one of said communication mechanisms via said data storage system to said communication mechanism resident within another one of said plurality of processes, and the at least one interface is a socket is allocated from a shared memory region in the data storage system by one of the processes, wherein the socket is not bound to any specific destination address and this socket interface is used by a series of calls contained in a socket library to establish a connection between said processes, and begin a transfer of information between processes.

8. The system of claim 7, wherein said communication mechanism is allocated individually to each of said plurality of processes by said data storage system when said interface requests said data storage system to allocate said communication to said process.

9. The system of claim 8, wherein said data storage system further comprises a control block table containing a plurality of available communication mechanisms, said control block table allocating said communications mechanisms upon a request from one of said processes.

10. The system of claim 9, said data storage system having a plurality of storage devices, said control block table being stored on at least one of said plurality of storage devices.

11. The system of claim 7, said plurality of host processors having different operating systems.

12. A data storage system for transferring information from a first process to a second process, each of which is running on a selected one of a plurality of host processors that are separately connected to said data storage system, said data storage system comprising:

a plurality of storage devices;

a shared storage region to which both of said first and second processes share access;

a control block table implemented in at least one of said plurality of storage devices; and wherein said control block table allocates a communication mechanism that is at least one interface for said first process which said first process uses to establish a connection to said second process through said shared memory storage region, and wherein the at least one interface is resident within each one of said plurality of processes, in which information stored in said local storage area is transferred by one of said communication mechanisms via said data storage system to said communication mechanism resident within another one of said plurality of processes, and the at least one interface is a socket that is allocated from the shared memory region in the data storage system by one of the processes, wherein the socket is not bound to any specific destination address and this socket interface is used by a series of calls contained in a socket library to establish a connection between said processes, and begin a transfer of information between processes.

13. A communication mechanism for transferring information between different processes each residing on a processor separately coupled to a data storage system, said communication mechanism being allocated from the data storage system comprising:

at least one interface integrated into each process for enabling the transfer of information from one process to another process where the data is transferred from one process to the other process through the data storage system, and the at least one interface is a socket is allocated from a shared memory region in the data storage system by one of the processes, wherein the socket is not bound to any specific destination address and this socket interface is used by a series of calls contained in a socket library to establish a connection between said processes, and begin said transfer of information.

14. The communication mechanism of claim 13, wherein said processes run on different host processors and each processor is connected to said data storage system.

15. The communication of claim 13, in which said at least one interface communicates with a protocol in communication with said data storage system.

16. The communication mechanism of claim 13, in which said allocation of said socket interface is done by using at least one of said plurality of computer system calls to request said socket interface from said data storage system.

17. The communication mechanism of claim 13, wherein said communication mechanism can be used with processes performing different functions.

* * * * *